United States Patent
Liu et al.

(10) Patent No.: US 12,232,631 B2
(45) Date of Patent: Feb. 25, 2025

(54) ASSEMBLY FOR CONCEALING A COMPARTMENT WITHIN AN ARMCHAIR OR FURNITURE CONSOLE

(71) Applicant: MOTOMOTION CHINA CORPORATION, Changzhou (CN)

(72) Inventors: Chih Hsiung Liu, Benoni (ZA); Hai Guo Jiang, Changzhou (CN); John A. Copley, North Abington Township, PA (US)

(73) Assignee: MOTOMOTION CHINA CORPORATION, Changzhou (CN)

( * ) Notice: Subject to any disclaimer, the term of this patent is extended or adjusted under 35 U.S.C. 154(b) by 163 days.

(21) Appl. No.: 18/140,450

(22) Filed: Apr. 27, 2023

(65) Prior Publication Data
US 2024/0358159 A1    Oct. 31, 2024

(51) Int. Cl.
A47C 7/62    (2006.01)
A47C 7/72    (2006.01)
B60N 2/75    (2018.01)
B60N 3/10    (2006.01)

(52) U.S. Cl.
CPC ............. *A47C 7/624* (2018.08); *A47C 7/622* (2018.08); *A47C 7/72* (2013.01); *B60N 2/793* (2018.02); *B60N 3/102* (2013.01)

(58) Field of Classification Search
CPC .......... A47C 7/624; A47C 7/622; A47C 7/72; A47C 7/626; B60N 2/793; B60N 3/102
USPC ....................................... 297/188.15–188.17
See application file for complete search history.

(56) References Cited

U.S. PATENT DOCUMENTS

| | | | | | |
|---|---|---|---|---|---|
| 1,907,322 | A | * | 5/1933 | Keicher | A47C 7/70 297/145 |
| 2,201,354 | A | * | 5/1940 | Steadman | A47C 7/72 126/339 |
| 2,229,937 | A | * | 1/1941 | Reese | A47C 7/72 312/235.6 |
| 2,734,559 | A | * | 2/1956 | Vaughn | A47C 7/624 312/274 |
| 4,087,126 | A | * | 5/1978 | Wynn | B60R 11/02 224/483 |
| 4,733,900 | A | * | 3/1988 | Fluharty | B60N 3/002 108/134 |
| 5,106,153 | A | * | 4/1992 | Durling | A47C 7/624 297/188.17 |
| 5,217,277 | A | * | 6/1993 | Rasnick | A47C 7/70 297/145 |

(Continued)

*Primary Examiner* — Robert Canfield
(74) *Attorney, Agent, or Firm* — Law Offices of Steven W. Weinrieb

(57) ABSTRACT

A concealable storage compartment assembly for use within a chair or console comprises a storage compartment assembly having a storage compartment mounted therein, a cover mounted upon the storage compartment assembly and movable between closed and open positions, a panel assembly movably mounted within a component of the chair, or within the console, so as to be movable between closed and open positions, and a linkage assembly operatively connecting the panel assembly to the cover such that when the panel assembly is moved between the closed and open positions, the cover is likewise moved between closed and open positions so as to cover and conceal the storage compartment or uncover and expose the storage compartment.

20 Claims, 15 Drawing Sheets

(56) References Cited

U.S. PATENT DOCUMENTS

| | | | | |
|---|---|---|---|---|
| 5,248,183 | A * | 9/1993 | Gignac | B60N 3/102 |
| | | | | 248/311.2 |
| 6,547,326 | B1 * | 4/2003 | Walkinshaw | B60N 3/102 |
| | | | | 297/188.01 |
| 7,025,316 | B2 * | 4/2006 | Schaal | B60N 3/102 |
| | | | | 248/312 |
| 11,490,736 | B1 * | 11/2022 | Liu | A47C 7/624 |
| 2003/0222474 | A1 * | 12/2003 | Liu | B60N 3/102 |
| | | | | 296/37.8 |
| 2004/0100174 | A1 * | 5/2004 | Yamamoto | B60N 3/102 |
| | | | | 312/332 |
| 2006/0097532 | A1 * | 5/2006 | Adams | B60R 7/04 |
| | | | | 296/24.34 |
| 2012/0187726 | A1 * | 7/2012 | Uwague-Igharo | B60N 3/002 |
| | | | | 297/135 |
| 2016/0236604 | A1 * | 8/2016 | Parlow | B60N 3/103 |
| 2019/0036364 | A1 * | 1/2019 | An | H02J 7/0044 |
| 2020/0113337 | A1 * | 4/2020 | Liu | A47C 7/624 |
| 2022/0202193 | A1 * | 6/2022 | Lou | A47C 13/005 |
| 2022/0408925 | A1 * | 12/2022 | Rafieha | A47C 7/624 |

\* cited by examiner

ASSEMBLY FOR CONCEALING A COMPARTMENT WITHIN AN ARMCHAIR OR FURNITURE CONSOLE

FIELD OF THE INVENTION

The present invention relates generally to structural assemblies, and more particularly to an assembly which is incorporated within an arm of a furniture piece, such as, for example, a lounge chair or the like, or a separate console, so as to operatively connect a forward, vertically oriented section of the arm of the chair, or the console, to a cover so as to uncover or conceal a compartment defined within the arm of the armchair or console. Accordingly, when the forward section of the arm of the armchair or console is pivotally moved between a rearward, retracted, or closed position, and a forward, extended, or open position, the cover will be correspondingly moved in a translational manner between closed and open positions so as to conceal or uncover the compartment. Still more particularly, the cover may effectively comprise a charging station for a portable device, such as, for example, a smart phone, and the compartment may either be a storage compartment or have incorporated therein at least one cupholder assembly.

BACKGROUND OF THE INVENTION

Lounge chairs, or similarly structured and operationally functional chairs, are common furniture pieces conventionally found within residential living rooms, family rooms, dens, home offices, and the like, as well as within business offices, conference rooms, cinemas, and the like. More often than not, such chairs are located within the various residential or business offices or rooms because users usually sit within such chairs while watching television or movies, reading a book, or the like. Concomitantly, such users prefer to partake of food and drink while involved within their television or movie viewing, or reading, activities, as well as to have access to their portable devices, such as, for example, their smart phones, which have become ubiquitous in today's society. Still further, users also prefer to have access to a storage compartment within which the users can store, for example, a TV remote control, a book that they are reading, and the like. The aforenoted is likewise true of separate consoles utilized in conjunction with armchairs. Accordingly, the provision of such a storage compartment, which may house one or more cup holders, and a portable device charging station, within the aforenoted chairs or consoles has effectively become a requirement or necessity when consumers and business executives are deciding upon a particular lounge chair or the like to purchase for their residences, offices, or businesses. However, the provision of such storage compartments or cup holders within the aforenoted chairs or consoles effectively presents several problems in that the conventional, constantly exposed storage compartments or cup holders detract from the smooth lines, silhouette, or overall aesthetic appearance of the chair. In addition, since the storage compartments or cup holders are constantly exposed to the ambient environment that they are in, they tend to collect dust which is not only unsightly, but requires dusting and cleaning, such that the lounge chair or the like exhibits a clean appearance.

A need therefore exists in the art for a new and improved storage compartment assembly. Another need exists in the art for a new and improved concealable storage compartment assembly for use within various furniture pieces. Yet another need exists in the art for a new and improved concealable storage compartment assembly for use within various furniture pieces wherein the storage compartment of the new and improved storage compartment assembly can be covered or uncovered as may be desired. Still another need exists in the art for a new and improved concealable storage compartment assembly for use within various furniture pieces wherein the storage compartment of the new and improved storage compartment assembly can be covered or uncovered, as may be desired, so that the aesthetic appearance of the furniture piece is preserved when the storage compartment is covered. Yet still another need exists in the art for a new and improved concealable storage compartment assembly for use within various furniture pieces wherein the storage compartment of the new and improved storage compartment assembly can be covered or uncovered, as may be desired, such that the aesthetic appearance of the furniture piece is preserved when the storage compartment is covered, and wherein access to a charging station for an electronic device, such as, for example, a smart phone, is also provided as a result of incorporating the same within the cover of the storage compartment assembly. A last need exists in the art for a new and improved concealable storage compartment assembly for use within various furniture pieces wherein the storage compartment of the new and improved storage compartment assembly can be covered or uncovered, as may be desired, such that the aesthetic appearance of the furniture piece is preserved when the storage compartment is covered, wherein access to a charging station for an electronic device, such as, for example, a smart phone, is also provided as a result of incorporating the same within the cover of the storage compartment assembly, and wherein the provision and movement of the cover of the storage compartment, comprising the smart phone charging station, between its open and closed positions respectively uncovering and covering the storage compartment, is operationally connected with a movable section of the furniture piece such that the cover, comprising the smart phone charging station, uncovers and covers the storage compartment when the movable section of the furniture piece is moved between its open and closed positions.

OVERALL OBJECTIVES OF THE INVENTION

An overall objective of the present invention is to provide a new and improved storage compartment assembly. Another overall objective of the present invention is to provide a new and improved concealable storage compartment assembly for use within various furniture pieces. Yet another overall objective of the present invention is to provide a new and improved concealable storage compartment assembly for use within various furniture pieces wherein the storage compartment of the new and improved storage compartment assembly can be covered or uncovered as may be desired. Still another overall objective of the present invention is to provide a new and improved concealable storage compartment assembly for use within various furniture pieces wherein the storage compartment of the new and improved storage compartment assembly can be covered or uncovered, as may be desired, such that the aesthetic appearance of the furniture piece is preserved when the storage compartment is covered. Yet still another overall objective of the present invention is to provide a new and improved concealable storage compartment assembly for use within various furniture pieces wherein the storage compartment of the new and improved storage compartment assembly can be covered or uncovered as may be desired, such that the aesthetic appearance of the furniture piece is preserved when the storage compartment is covered, and wherein access to a charging station for an electronic device, such as, for example, a smart phone, is also provided as a result of incorporating the same within the cover of the storage compartment assembly. A last overall objective of the present invention is to provide a new and improved concealable storage compartment assembly for use within various furniture pieces wherein the storage compartment of the new and improved storage compartment assembly can be covered or uncovered as may be desired, such that the aesthetic appearance of the furniture piece is preserved when the storage compartment is covered, wherein access to a charging station for an electronic device, such as, for example, a smart phone, is also provided as a result of incorporating the same within the cover of the storage compartment assembly, and wherein the provision and movement of the smart phone charging station, between its open and closed positions respectively uncovering and covering the storage compartment, is operationally connected with a movable section of the furniture piece such that the smart phone charging station uncovers and covers the storage compartment when the movable section of the furniture piece is moved between its open and closed positions.

SUMMARY OF THE INVENTION

The foregoing and other objectives of the present invention are met in accordance with the principles and teachings of the present invention wherein the concealable storage compartment assembly of the present invention comprises a mounting bracket which is adapted to be fixedly mounted within a forward end region of one arm of a furniture piece, such as, for example, a lounge chair or the like, or within a separate furniture console, and a storage compartment integral with, or fixedly mounted within, the mounting bracket. A cover is slidably mounted upon side rail members of the mounting bracket of the storage compartment assembly so as to be movable between a forward position, at which the cover uncovers the storage compartment, and a rearward position at which the cover covers the storage compartment. In addition, the concealable storage compartment assembly also comprises a panel assembly, which includes a front panel member which effectively forms an external front surface portion of the aforenoted arm of the furniture piece, or the front surface portion of the console, and a linkage assembly which operatively connects the front panel member to fixed mounting brackets disposed internally within the side arm frame members of the furniture piece or console, as well as to the storage compartment cover. In this manner, as the front panel member is moved forwardly and rearwardly between its open and closed positions, the cover is likewise moved forwardly and rearwardly so as to respectively uncover and cover the storage compartment mounted within the storage compartment assembly. As will be more fully appreciated hereinafter, and as one example, the storage compartment assembly may comprise a cup holder assembly which may, in turn, house or accommodate one or more cup holders for the convenience of the chair occupant. In addition, the cover, for covering and uncovering the storage compartment or one or more cup holders, may comprise a wireless charging station which, again, conveniently facilitates the charging of electronic devices of the chair occupant, such as, for example, a smart phone or the like.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
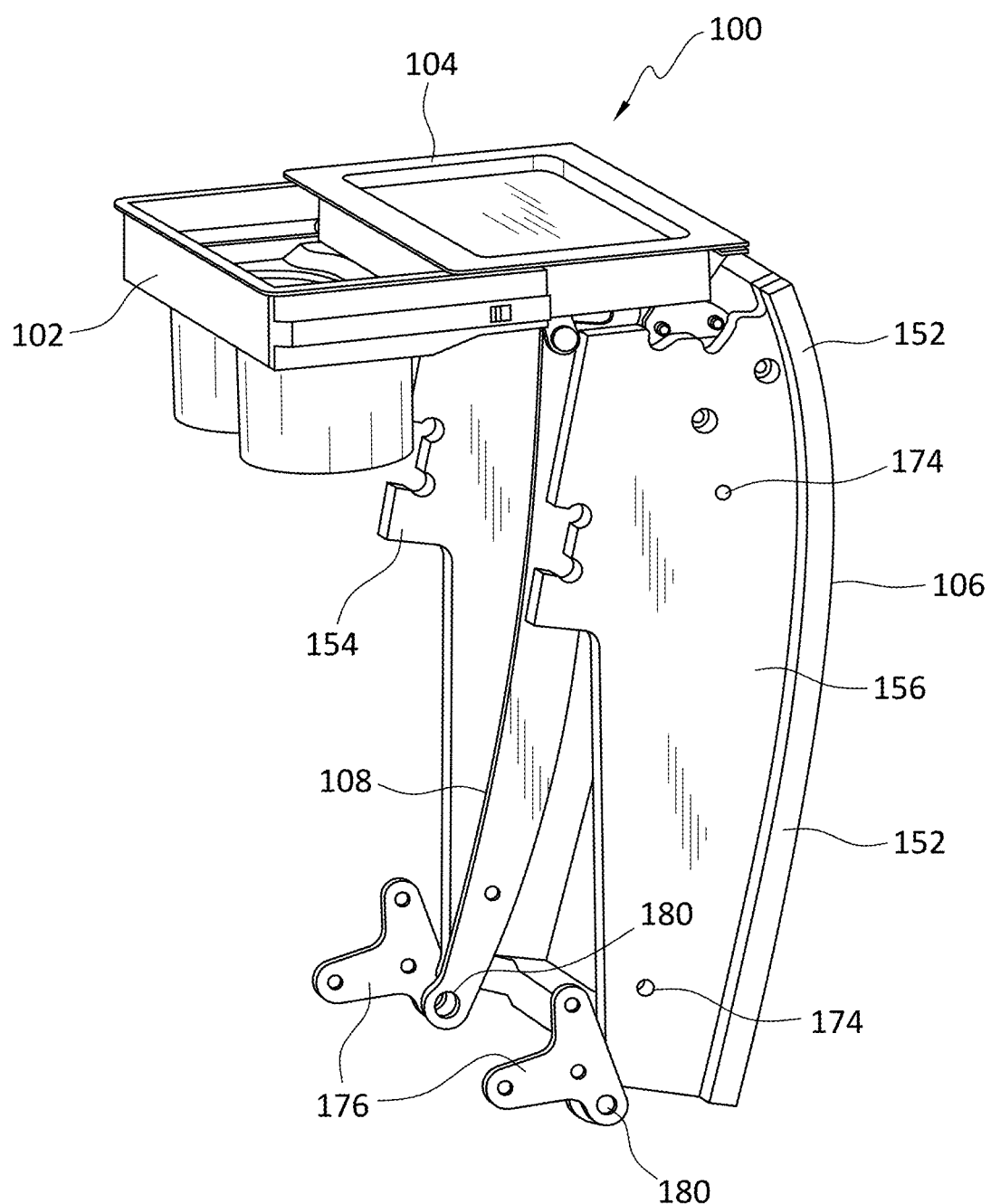
FIG. 1 is a left side perspective view of the new and improved concealable cup holder assembly as constructed in accordance with the principles and teachings of the present invention, and showing the cup holders in their uncovered or exposed states.

With reference now being made to the drawings, and more particularly to FIGS. 1-7 thereof, a new and improved concealable storage compartment assembly, constructed in accordance with the principles and teachings of the present invention, is disclosed and is generally indicated by the reference character 100. It is to be noted that while the storage compartment can be a storage compartment within which various items, such as, for example, a TV remote, a book, reading glasses, or the like, can be stored for the convenience of the user, the storage compartment will be described as a compartment within which one or more cup holders are accommodated, and that the cover, for covering or uncovering the compartment, comprises a wireless charging station integrally incorporated within the cover. Accordingly, it is seen that the new and improved concealable cup hold assembly 100 comprises an integral cup holder and cup holder mounting bracket assembly 102, a wireless charging station 104 slidably mounted upon the forward end portion of the integral cup holder and cup holder mounting bracket assembly 102, a panel assembly 106 which effectively forms a vertically oriented, movable front portion of one of the arms of the furniture piece within or upon which the integral cup holder and cup holder mounting bracket assembly 102 and the wireless charging station 104 are adapted to be mounted, and a pair of oppositely disposed linkage assemblies 108 operatively connecting the panel assembly 106 to the wireless charging station 104 such that as the panel assembly 106 is moved between its forward, open, and rearward, closed positions, the wireless charging station 104 will be correspondingly moved between its forward, open position at which the wireless charging station 104 will uncover or expose the cup holders mounted within the integral cup holder and cup holder mounting bracket assembly 102, and its rearward, closed position at which the wireless charging station 104 will cover and conceal the cup holders mounted within the integral cup holder and cup holder mounting bracket assembly 102.

Figure 5:
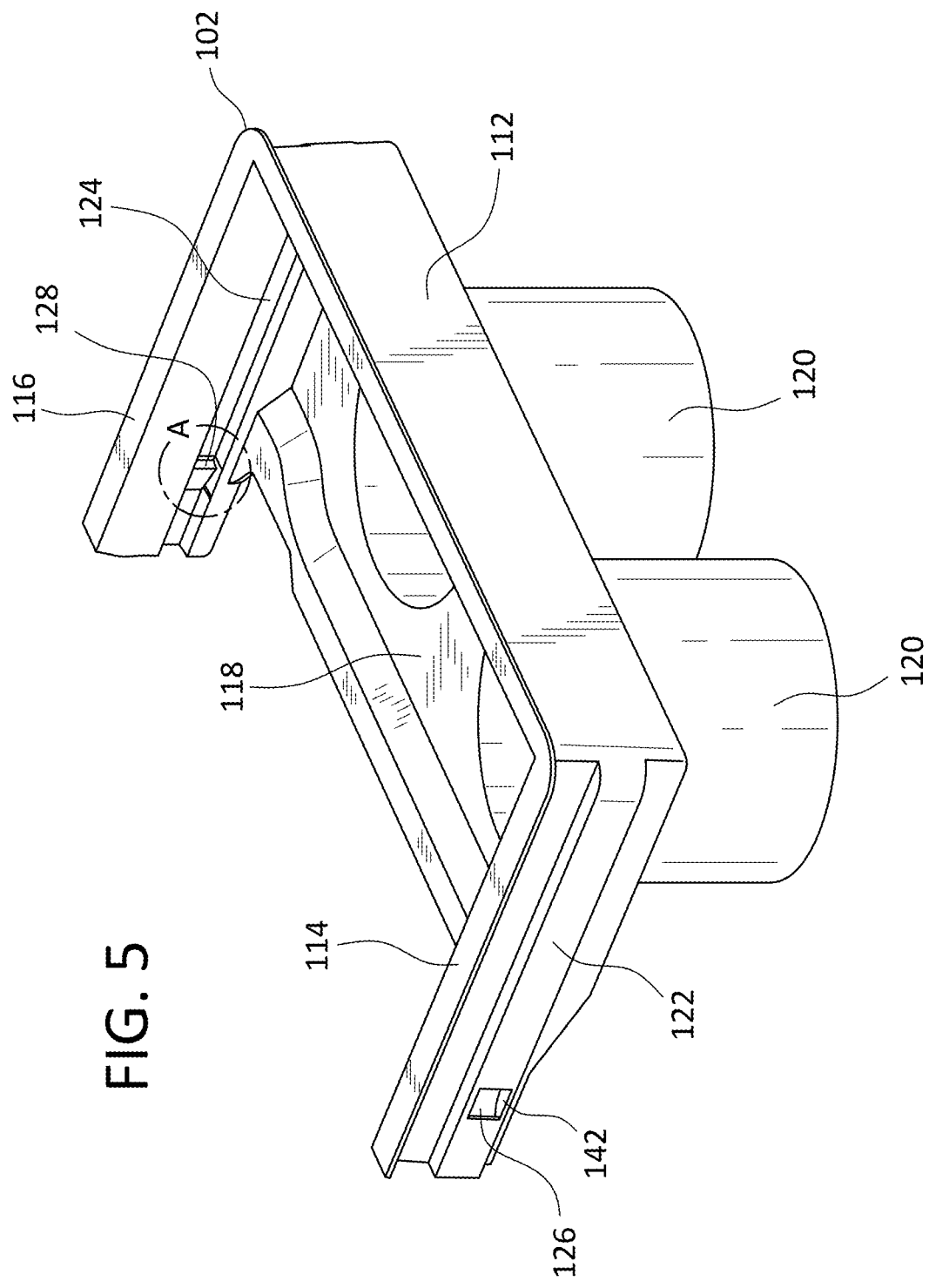
FIG. 5 is a rear perspective view of the cup holder mounting bracket and the cup holders fixedly or integrally mounted within the cup holder mounting bracket.
Figure 6:
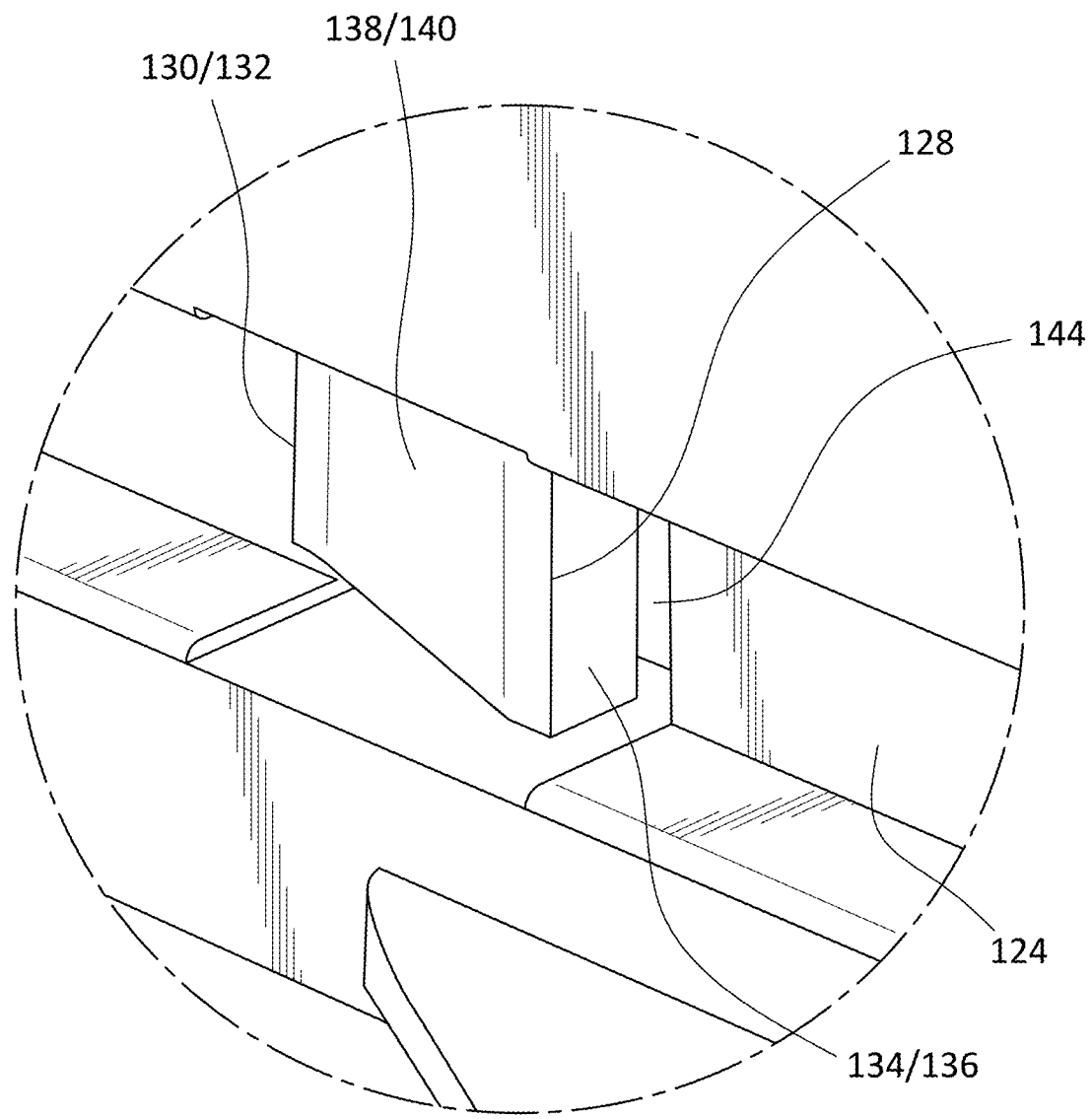
FIG. 6 is an enlarged detailed view of the encircled region A, as illustrated within FIG. 5, showing the detent clips for maintaining the wireless charging station engaged within the tracks of the cup holder mounting bracket when the wireless charging station has been moved from its rearward position, at which the wireless charging station covers the cup holders, toward its forward position at which the wireless charging station uncovers the cup holders.

As can best be seen and appreciated from FIG. 5, the integral cup holder and cup holder mounting bracket assembly 102 is seen to comprise a three-sided framework 110 comprising a rear wall 112, a pair of oppositely disposed side walls 114, 116, and a floor or platform 118 within which a pair of cup holders 120, 120 are mounted, it being noted that the entire cup holder and cup holder mounting bracket assembly 102, comprising the aforenoted components, may be fabricated as one integral piece or structure. In addition, it is also seen that each of the pair of oppositely disposed side walls 114, 116 is provided with a rail or track 122, 124 which extends longitudinally from the open end of the three-sided framework 110 toward the closed end or rear wall 112 of the three-sided framework 110. Still further, and as can best be seen and appreciated from FIG. 6, a detent 126, 128 is respectively provided within each one of the rails or tracks 122, 124 at a location which is adjacent to the open end of each rail or track 122,124, and it is seen that each detent 126, 128 is connected to a side wall portion of the rails or tracks 122, 124 by an integral or living hinge structure 130, 132, only one of which is visible, the structure being such that the default or normal positions of the detents 126, 128 are their extended positions whereby the detents 126, 128 extend into the rails or tracks 122, 124. The opposite end of each detent 126, 128 effectively forms a limit stop 134, 136, only one of which is visible, while a ramp 138, 140, only one of which is visible, interconnects the integral hinges 130, 132 and the limit stops 134, 136. Lastly, as can best be appreciated from FIG. 5, each one of the side rails or tracks 122, 124 is also provided with an aperture 142, 144, for accommodating the detent 126, 128 operatively associated therewith, so as to permit the detents 126, 128 to move from their extended positions, as illustrated within FIGS. 5 and 6, to retracted positions within the rails or tracks 122, 124, when it is desired to mount the wireless charging station 104 upon the integral cup holder and cup holder mounting bracket assembly 102, as will become more apparent when the functions and operations of the detents 126, 128 are described with additional reference being made to FIG. 7.

Figure 7:
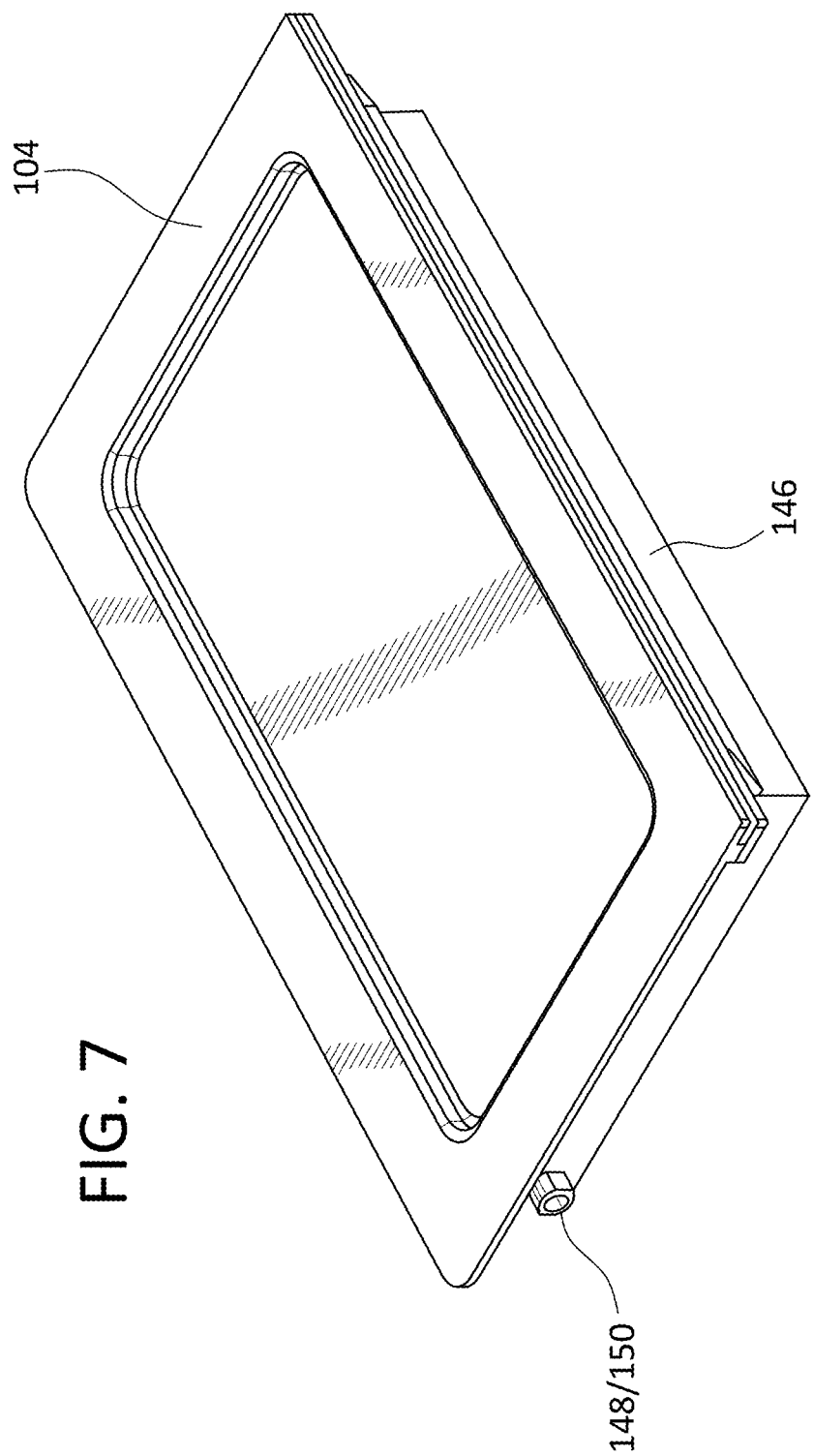
FIG. 7 is a perspective view of the wireless charging station operatively associated with the concealed cup holder assembly.

More particularly, with reference therefore now being made to FIG. 7 so as to best appreciate and understand the mounting of the wireless charging station 104 upon the integral cup holder and cup holder mounting bracket assembly 102, as well as the movement of the wireless charging station 104 relative to the integral cup holder and cup holder mounting bracket assembly 102 between its open or forward position, at which the wireless charging station 104 uncovers or exposes the cup holders 120, 120, and the closed or rearward position, at which the wireless charging station 104 covers or conceals the cup holders 120, 120, it is seen that the wireless charging station 104 is mounted upon an underlying framework or reinforcing plate 146, and that a projection or stud 148, 150, only one of which is visible, is fixedly mounted upon each one of the opposite sides of the underlying framework or reinforcing plate 146 at a position adjacent to the rearward end of the underlying framework or reinforcing plate 146. Accordingly, it can be further appreciated, with additional reference being made to FIG. 5, that when the wireless charging station 104 is to be mounted upon the integral cup holder and cup holder mounting bracket assembly 102, the projections or studs 148,150, disposed upon the opposite sides of the underlying framework or reinforcing plate 146, will be inserted into the oppositely disposed rails or tracks 122, 124 of the integral cup holder and cup holder mounting bracket assembly 102.

It can therefore be additionally appreciated that as the projections or studs 148, 150 are inserted into the open, forward end portions of the oppositely disposed rails or tracks 122, 124, the projections or studs 148, 150 will initially encounter the detents 126, 128, and more particularly, will encounter and engage the ramp portions 138, 140 of the detents 126, 128. Accordingly, further insertion of the projections or studs 148, 150 into the open, forward end portions of the oppositely disposed rails or tracks 122, 124 will effectively result in the studs or projections 148, 150 forcing the detents 126, 128 to be moved into their respective apertures 142, 144 so as to, in turn, permit the projections or studs 148, 150 to effectively move beyond the detents 126, 128. It is to be further appreciated that once the projections or studs 148, 150 move beyond the detents 126, 128, the detents 126, 128 will revert, or once again be returned, to their normal or default positions at which the detents 126, 128 will project or extend out from their apertures 142, 144 and into the oppositely disposed rails or tracks 122, 124, as is shown within FIG. 6. Accordingly, it can therefore be additionally appreciated that the limit stops 134, 136 now effectively block any retrograde movement of the projections or studs 148, 150 out from the oppositely disposed rails or tracks 122, 124 of the integral cup holder and cup holder mounting bracket assembly 102 such that the wireless charging station 104 cannot be inadvertently dislodged or removed from the integral cup holder and cup holder mounting bracket assembly 102 when the wireless charging station 104 is moved forwardly to its open position at which the cup holders 120, 120 are uncovered and exposed.

With reference again being made to FIGS. 1-4a, the panel assembly 106, and the pair of oppositely disposed linkage assemblies 108 which, as has been noted, operatively connect the panel assembly 106 to the wireless charging station 104, will now be more fully described. More specifically, it is seen that the panel assembly 106 comprises a front panel member 152, which effectively forms an external front surface portion of the aforenoted arm of the furniture piece, and a pair of oppositely disposed side panel members 154, 156, while the linkage assembly 108 is adapted to be fixedly connected to both the panel assembly 106, and the wireless charging station 104 whereby, as will be made clearer by the following detailed description, such that when the panel assembly 106 is moved between its forward or open position, and its rearward or closed position, the wireless charging station 104 will be correspondingly moved to its forward or open position, at which it will uncover or expose the cup holders 120, 120 mounted within the integral cup holder and cup holder mounting bracket assembly 102, and its rearward or closed position, at which it will cover and conceal the cup holders 120, 120 mounted within the integral cup holder and cup holder mounting bracket assembly 102.

Figure 3:
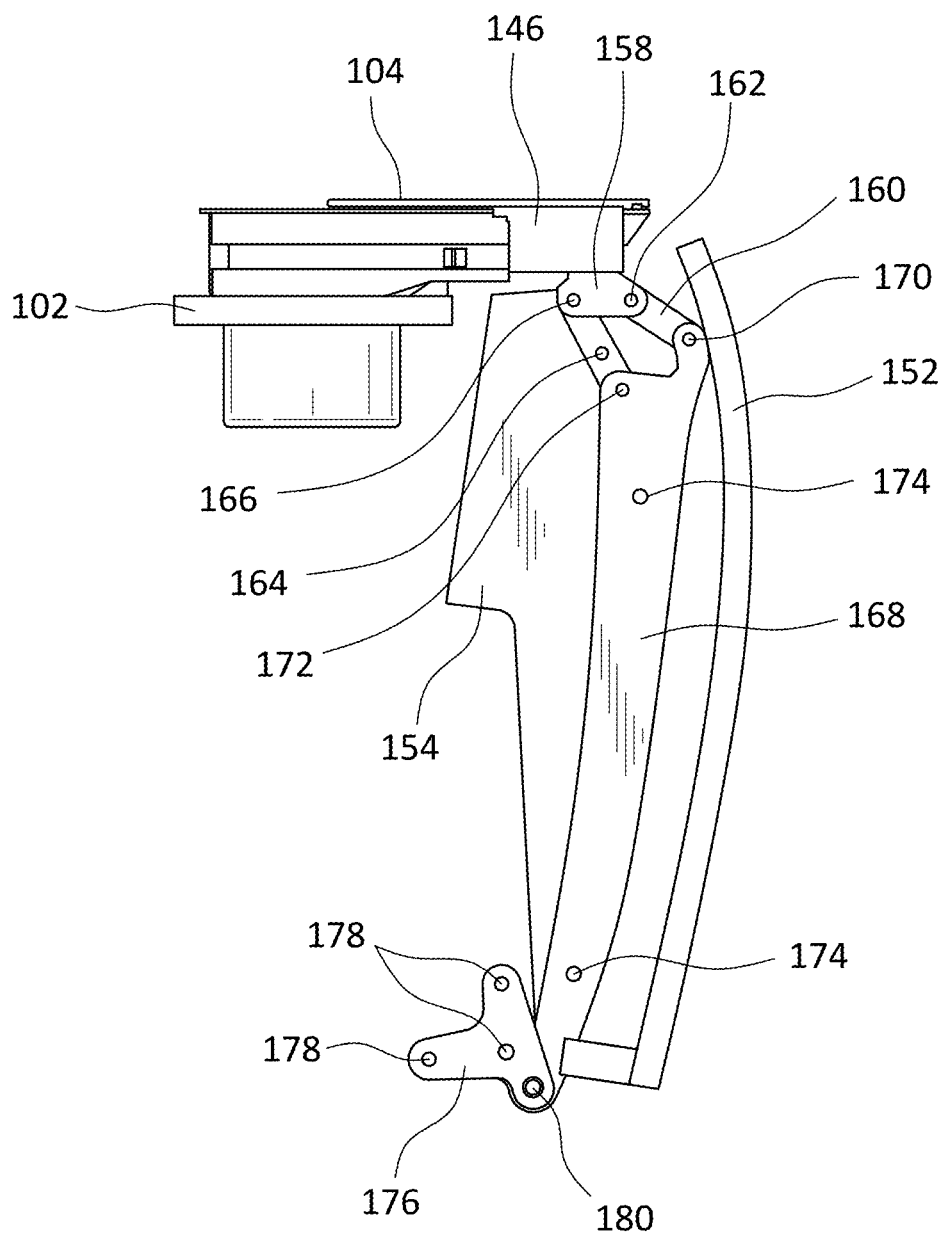
FIG. 3 is a left side elevational view of the new and improved concealable cup holder assembly as illustrated within FIG. 2.
Figure 4:
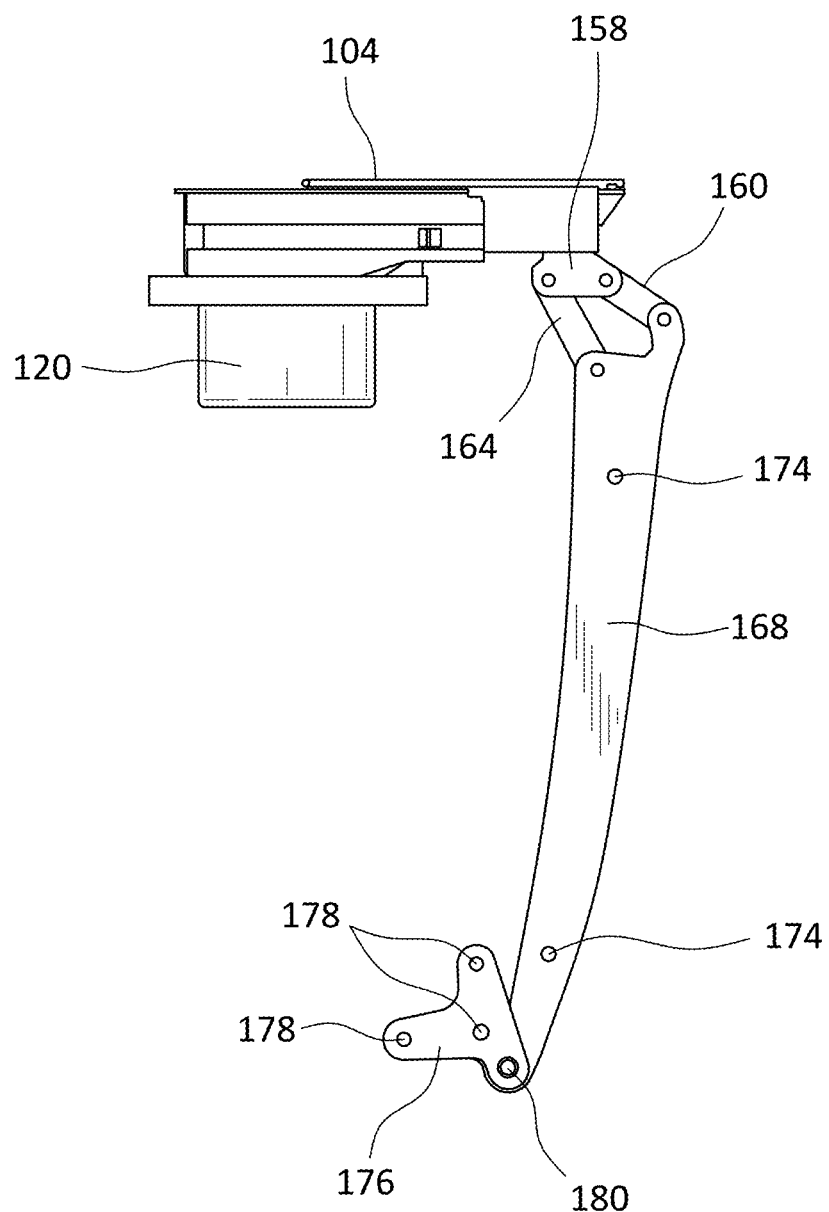
FIG. 4 is a left side elevational view of the new and improved concealable cup holder assembly as illustrated within FIG. 2, with the left side and front cover panel members having been removed.
Figure 4A:
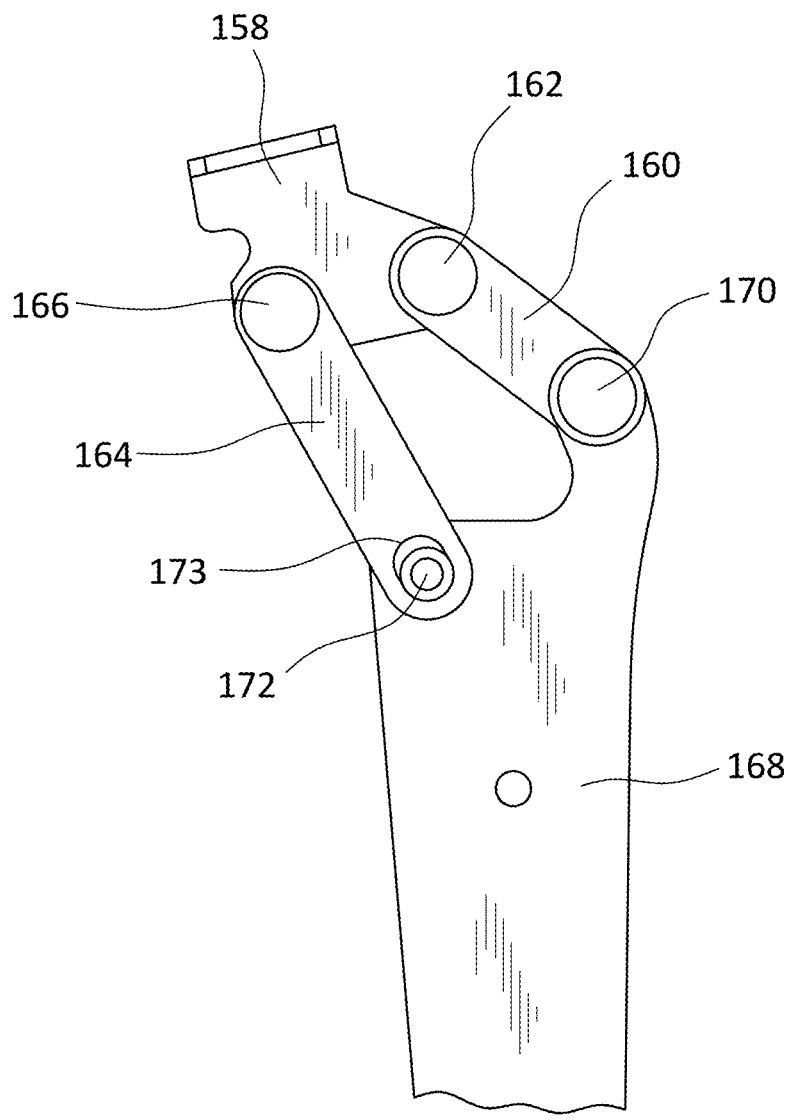
FIG. 4a is an enlarged detailed view of the linkage members operatively connecting the front and side panel members of the panel assembly to the wireless charging station such that when the panel assembly undergoes movements between its open and closed positions, the wireless charging station will undergo corresponding movements.

With reference now being made to FIGS. 2-4 and 4a, it is seen that each one of the linkage assemblies 108 comprises a first linkage member 158 which is fixedly secured to an undersurface portion of the underlying framework or reinforcing plate 146 of the wireless charging station 104, a second linkage member 160 which is pivotally attached at a first end thereof to a first end of the first linkage member 158 as at 162, and a third linkage member 164 which is pivotally attached at a first end thereof to a second opposite end of the first linkage member 158 as at 166. In addition, it is seen that a second opposite end of the second linkage member 160 is pivotally connected to a first upper end portion of a substantially vertically oriented fourth linkage member 168 as at 170, while a second opposite end of the third linkage member 164 is pivotally connected to a second upper end portion of the substantially vertically oriented fourth linkage member 168 as at 172. It is to be noted that the pivot connection defined between the second opposite end of the third linkage member 164 and the second upper end portion of the substantially vertically oriented fourth linkage member 168, as at 172, actually comprises a pivot pin within a bushing, and the pivot pin-bushing assembly is disposed within an elongated or ovoid slot 173 such that as the various linkage members undergo their pivotal movements, the pivot pin-bushing assembly can undergo vertical up and down movements within the slot 173. It is additionally seen that the substantially vertically oriented fourth linkage member 168 is provided with apertures 174, 174, within upper and lower regions thereof, so as to facilitate fixedly attaching each one of the fourth linkage members 168 to the side panel members 154, 156 by suitable fasteners. Still further, it is seen that a pair of oppositely disposed mounting plates 176, 176 each have a plurality of apertures 178 defined therein, as best seen in FIG. 3, such that suitable fasteners, not shown, can fixedly attach the mounting plates 176, 176 to interior portions of the furniture piece framework. In addition, as can best be seen in FIG. 1, the lower end portion of each one of the fourth linkage members 168 is pivotally connected to a respective one of the mounting plates 176, 176 as at 180, all as will be more fully appreciated hereinafter.

Figure 2:
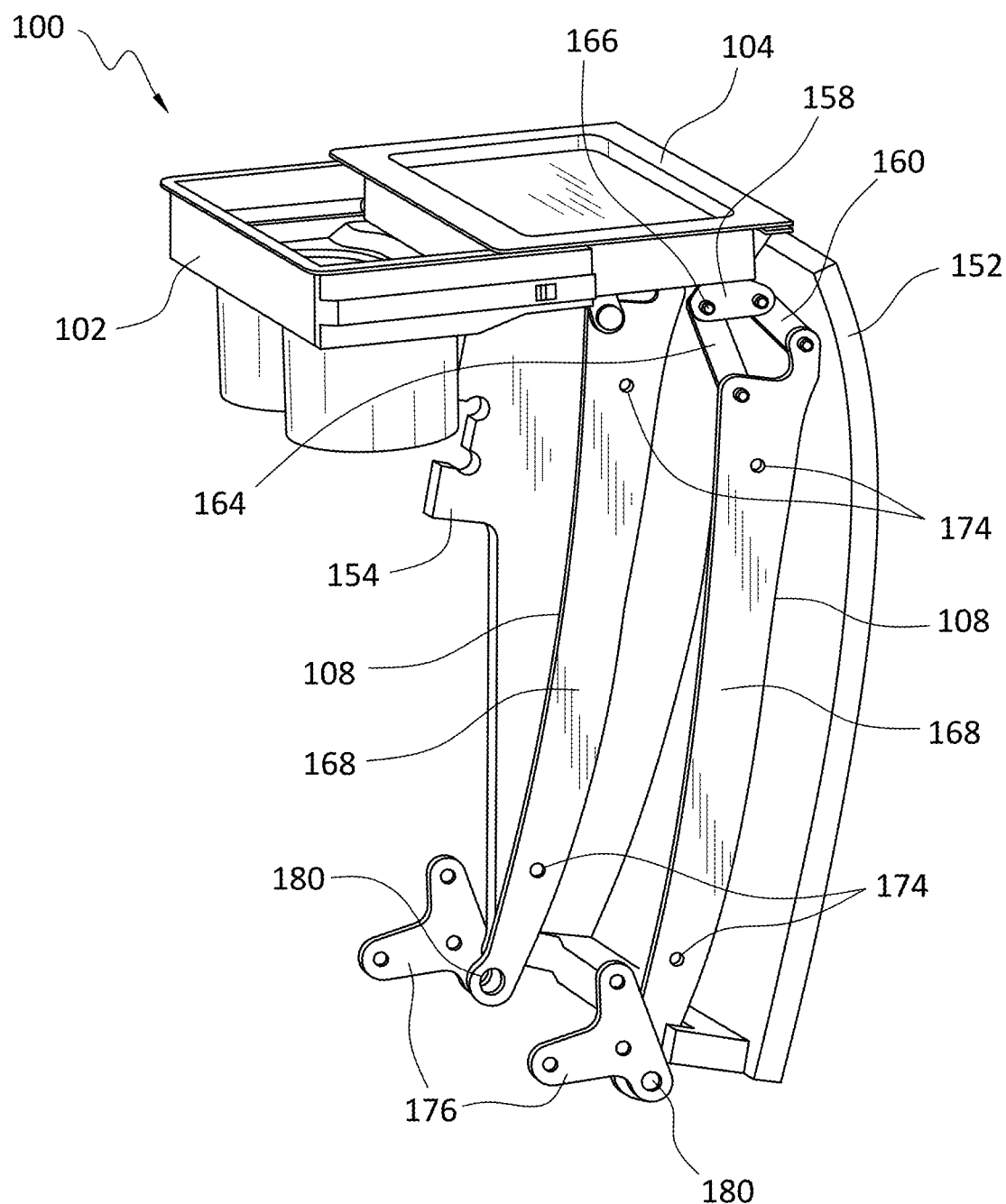
FIG. 2 is a left side perspective view of the new and improved concealable cup holder assembly, as illustrated within FIG. 1, with the left side panel member has been removed so that the linkage system of the new and improved concealed cup holder assembly can be better appreciated.
Figure 2A:
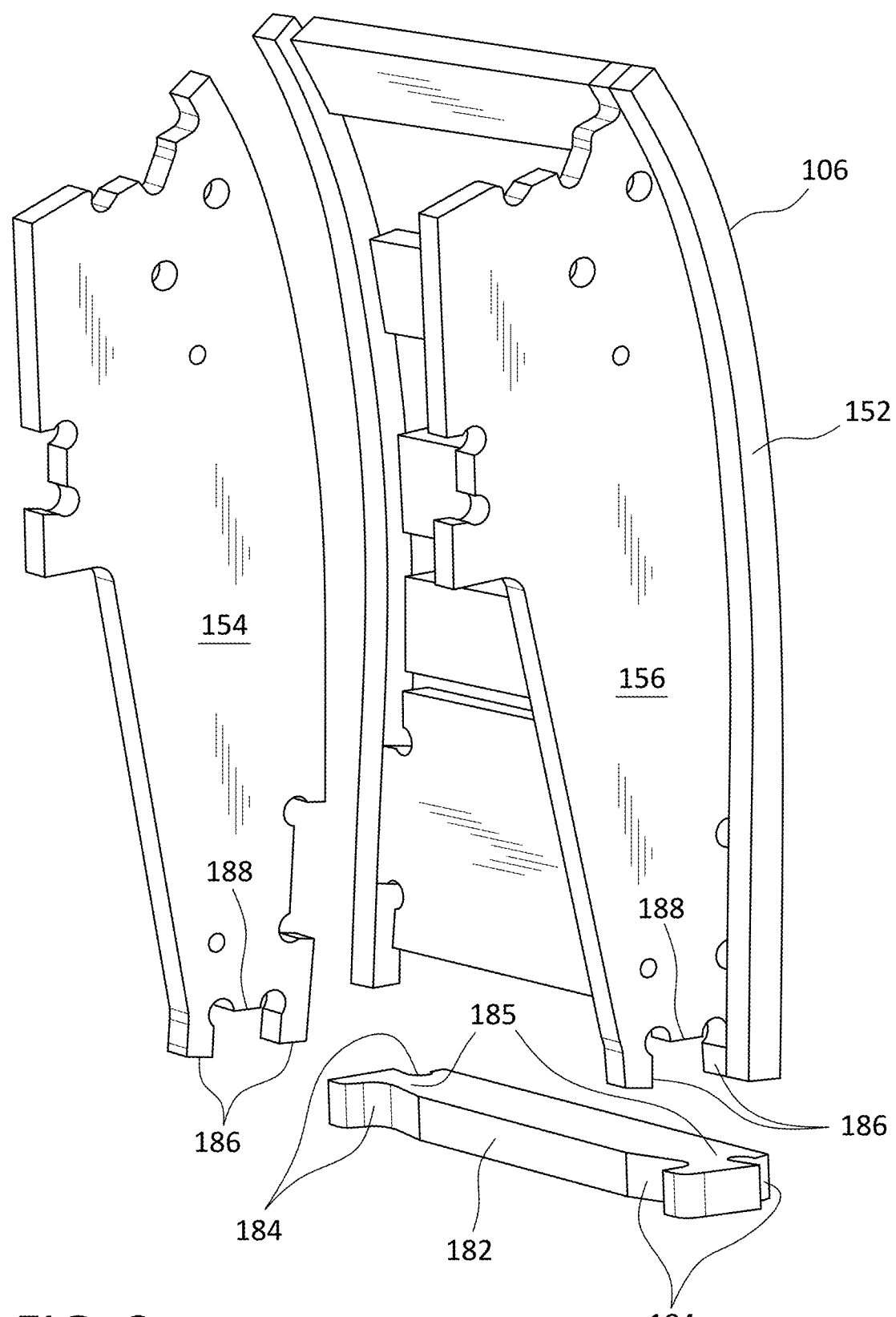
FIG. 2a is an exploded perspective view of the panel assembly so as to clearly illustrate how the front, left and right side, and bottom panel members are adapted to fit together.
Figure 2B:
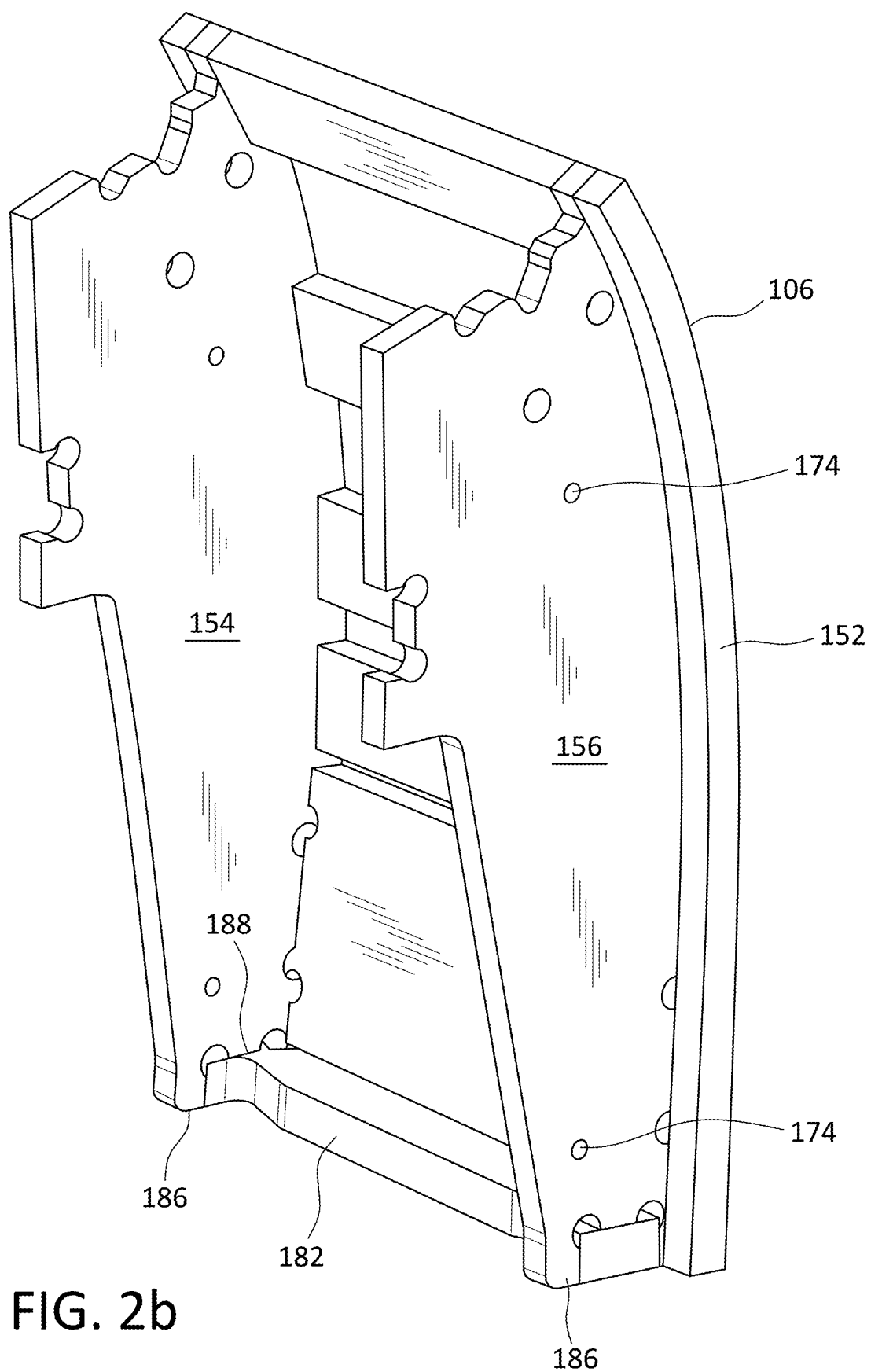
FIG. 2b is a perspective view of the panel assembly, similar to that of FIG. 2a, showing how the front, left and right side, and bottom panel members are in fact mated together.
Figure 2C:
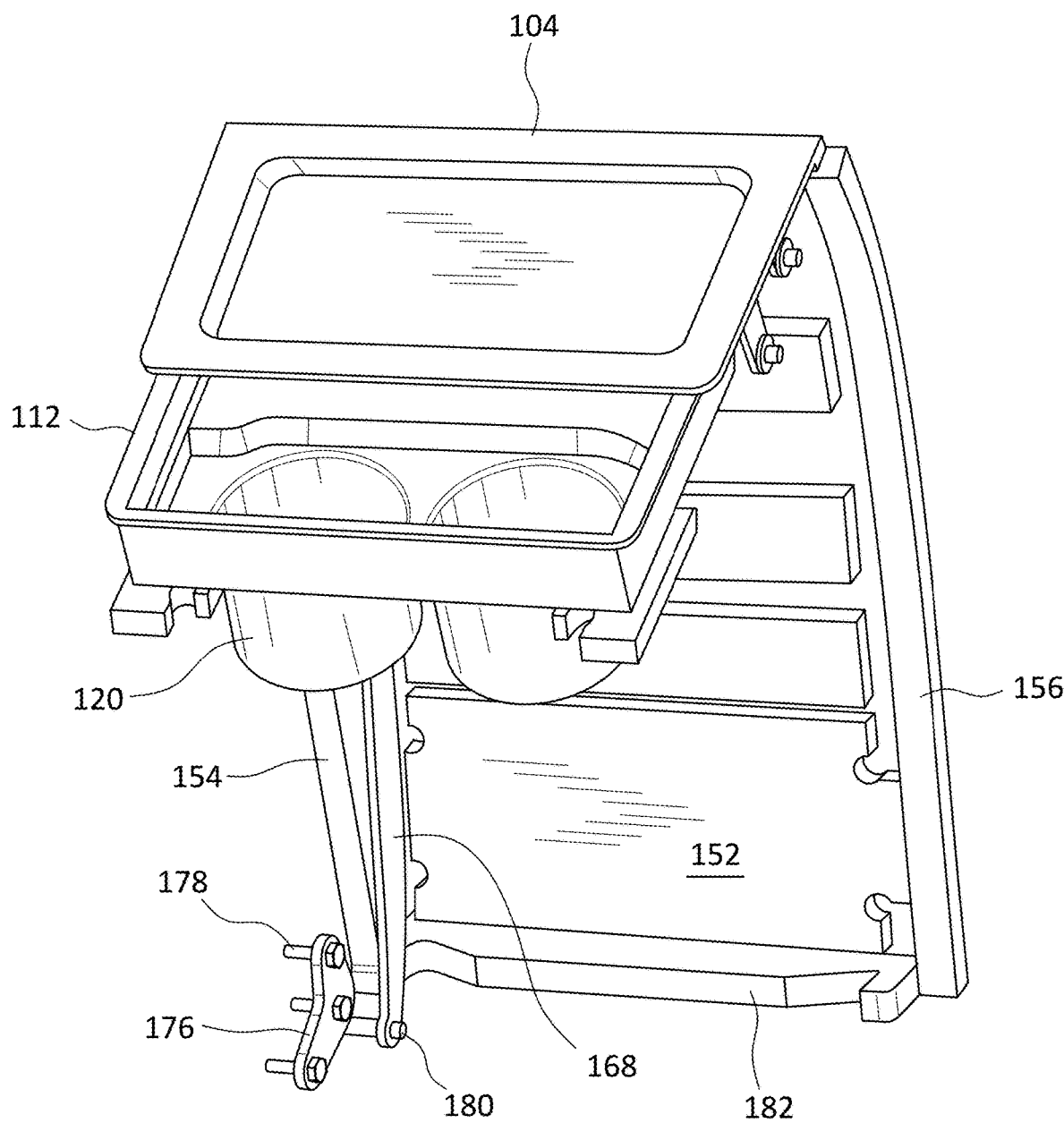
FIG. 2c is a perspective view of the panel assembly showing how the panel assembly is mounted upon the mounting plates which are fixedly secured to opposite interior wall portions of the furniture piece.

More particularly, as can best be appreciated from FIGS. 2a-2c, it is seen that, as has been noted, the panel assembly 106 comprises a front panel member 152, oppositely disposed side panel members 154, 156, and a bottom panel member 182. The panel members 152, 154, 156, 182 are adapted to be assembled or connected together by joint structures which are similar to well-known mortise and tenon components. For example, as is seen in FIG. 2a, opposite ends of bottom panel member 182 are provided with pairs of mortise openings or concavities 184 separated by bridge members 185, 185, while the bottom edge portions of the oppositely disposed side panel members 154, 156 are provided with pairs of tenon members 186, 186 whereby central bottom edge portions 188, 188 of the oppositely disposed side panel members 154, 156 are adapted to sit atop the bridge members 185, 185 while the tenon members 186, 186 are inserted into mortise openings or concavities 184, 184. The assembled panel assembly 106 is illustrated within FIG. 2b, and as can be best appreciated from FIG. 2c, when taken in conjunction with FIGS. 1-4, the pivotal connections 180 comprise pivot pins or the like which pass through the mounting plates 176, 176 and the lower end portions of the fourth linkage members 168, 168, while the tenon members 186, 186 of the oppositely disposed side panel members 154,156 are disposed atop the pivot pin shafts and effectively captured between the mounting plates 176, 176 and the lower end portions of the fourth linkage members 168, 168, it being remembered that the side panel members 154, 156 are also fixedly attached to the side panel members 154, 156 by the fasteners passing through the apertures 174, 174.

Figure 8:
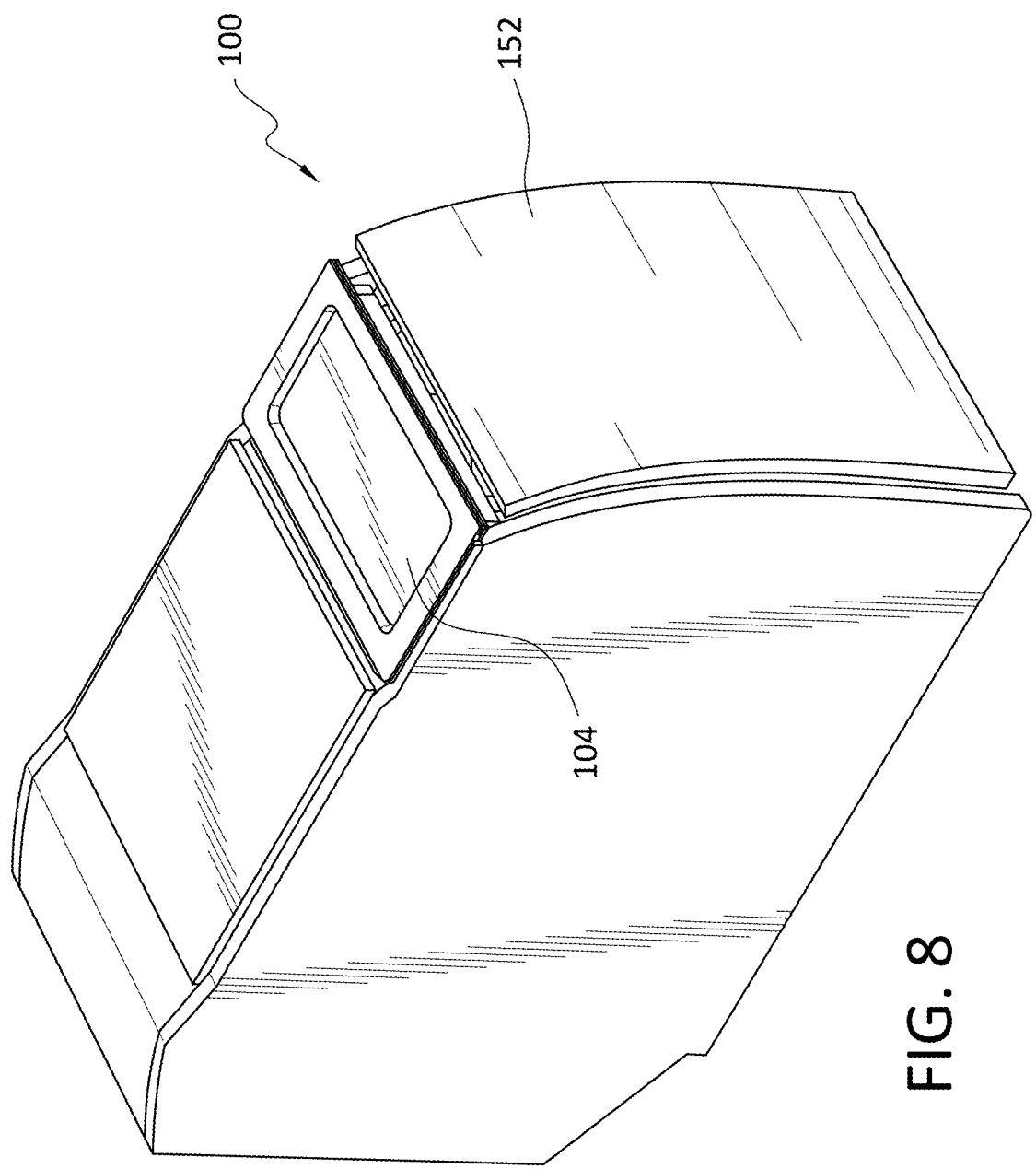
FIG. 8 is a perspective view of a console furniture piece within which the new and improved concealable cup holder assembly of the present invention is incorporated, the front panel member of the console furniture piece and the wireless charging station both being disposed at their rearward or closed positions so as to conceal the cup holders within the cup holder assembly.
Figure 9:
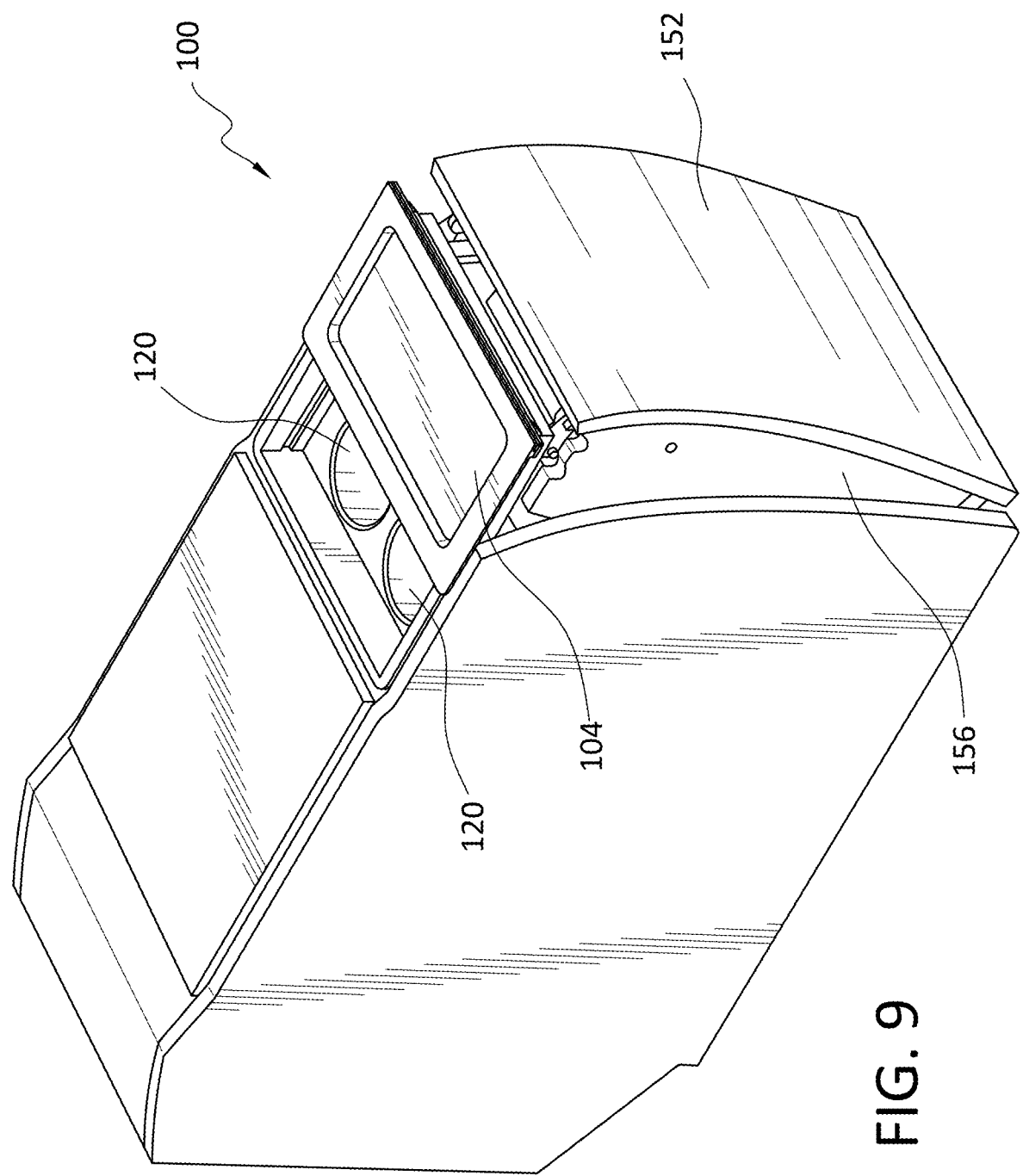
FIG. 9 is a perspective view of one of a console furniture piece within which the new and improved concealable cup holder assembly of the present invention is incorporated, as has been illustrated within FIG. 8, showing, however, the front panel member of the console furniture piece and the wireless charging station both being disposed at their forward or open positions so as to uncover or expose the cup holders within the cup holder assembly.
Figure 10:
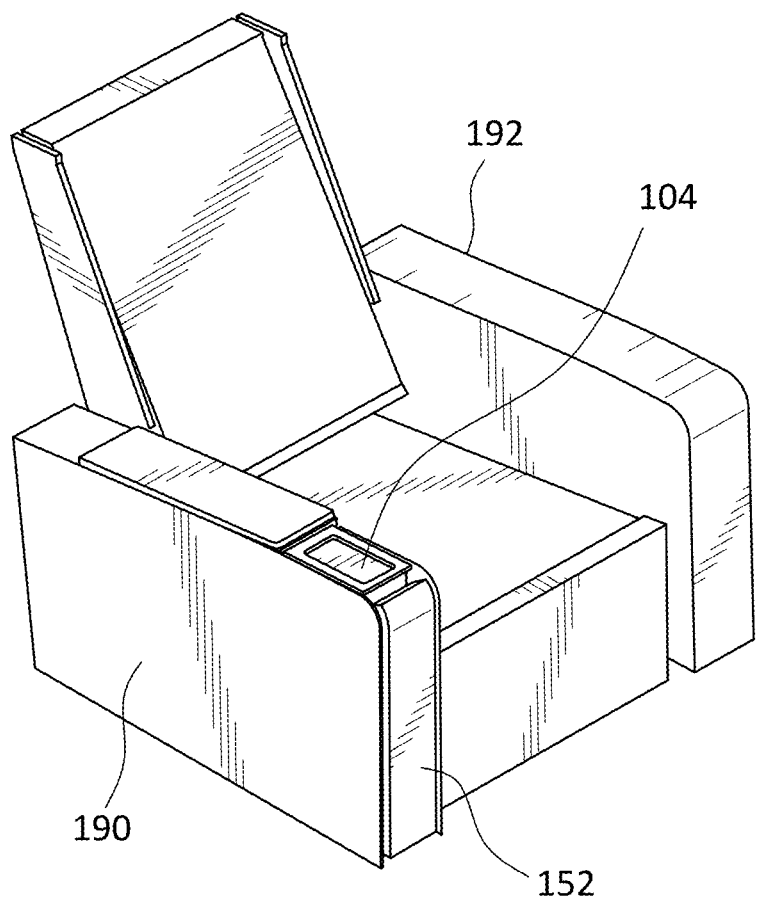
FIG. 10 is a perspective view of a furniture piece within which the new and improved concealable cup holder assembly of the present invention is incorporated within one of the side arms thereof, the front panel member of the furniture piece arm and the wireless charging station both being disposed at their rearward or closed positions so as to cover or conceal the cup holders disposed within the cup holder assembly.
Figure 11:
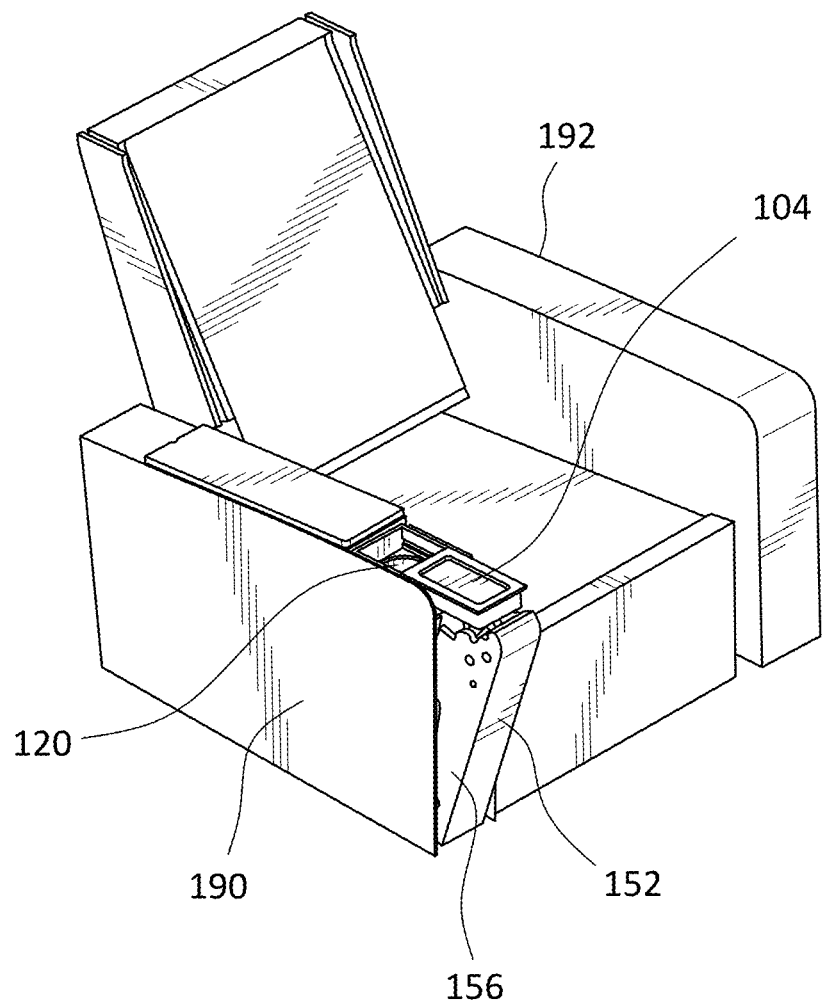
FIG. 11 is a perspective view of a furniture piece, similar to that illustrated within FIG. 10 and within which the new and improved concealable cup holder assembly of the present invention is incorporated within one of the side arms thereof, wherein, however, the front panel member of the furniture piece arm and the wireless charging station are both disposed at their forward or open positions so as to uncover or expose the cup holders disposed within the cup holder assembly.

With reference now being made to FIG. 8, there is disclosed a perspective view of a console furniture piece within which the new and improved concealable cup holder assembly 100 of the present invention is incorporated, the front panel member 152 of the console furniture piece and the wireless charging station 104 both being disposed at their rearward or closed positions so as to cover and conceal the cup holders within the cup holder mounting assembly. To the contrary, as shown within FIG. 9, there is disclosed a perspective view of one of the console furniture piece within which the new and improved concealable cup holder assembly 100 of the present invention is incorporated, as has been illustrated within FIG. 8, showing, however, the front panel member 152 of the console furniture piece and the wireless charging station 104 both being disposed at their forward or open positions so as to uncover or expose the cup holders 120, 120 integrally incorporated within the cup holder mounting assembly 102. As is illustrated within FIG. 10, there is disclosed a perspective view, similar to that of FIG. 8, wherein, however, it is seen that the new and improved concealable cup holder assembly 100 of the present invention has been incorporated within an arm 190 of a furniture piece 192, which may be, for example, a conventional lounger reclining chair, the front panel member 152 of the furniture piece arm 190 and the wireless charging station 104 both being disposed at their rearward or closed positions so as to cover or conceal the cup holders disposed within the cup holder assembly. In a similar manner, FIG. 11 is a perspective view of the furniture piece 192, similar to that illustrated within FIG. 10 and within which the new and improved concealable cup holder assembly 100 of the present invention is incorporated within one of the side arms 190 thereof, wherein, however, the front panel member 152 of the furniture piece arm 190 and the wireless charging station 104 have both been moved to their forward or open positions so as to uncover or expose the cup holders 120 disposed within the cup holder mounting assembly 102.

Having described substantially all of the operative components comprising the new and improved concealable cup holder assembly 100, a brief description of its operation will now be provided. Assuming that the panel assembly 106 is disposed at its closed position, as illustrated within FIGS. 8 and 10, such that the wireless charging station 104 is likewise disposed at the rearward or closed position at which it covers and conceals the cupholders 120, 120, then when a user grasps the front panel 152 of the panel assembly 106 and pulls it forwardly so as to move the panel assembly 106 from the closed position, as shown in FIG. 10 to the open position shown in FIG. 11, the wireless charging station 104 will likewise be moved from its closed position at which it covers and conceals the cup holders 120,120, to the open position at which the cup holders 120,120 are uncovered and rendered accessible. More particularly, with reference best being made to FIG. 4a, and discussing only one of the linkage assemblies, although corresponding movements will occur within the oppositely disposed linkage assembly, when the user grasps the front panel 152 of the panel assembly 106 and pulls it forwardly, the fourth linkage member 168 will pivot or rotate around the lower pivot pin connection 180, due to the fact that the fourth linkage member 180 is fixedly connected to the side panel member 156, thereby simultaneously causing the first, second, and third linkage members 158, 160, 164 to move toward the right as viewed in FIG. 4a.

Accordingly, the second linkage member 160 will pivot or rotate in the clockwise direction around the pivot connection 170, while the third linkage member 164 likewise pivots or rotates in the clockwise direction around the pivot connection 172. These two movements of the second and third linkage members 160, 162 will cause the first linkage member 158, which is fixedly attached to the undersurface portion of the underlying framework or reinforcing plate 146 of the wireless charging station 104, to also move toward the right in a translational or linear mode, as viewed within FIG. 4a, so as to, in turn, cause the wireless charging station 104 to move toward the right in a similar mode, thereby uncovering and exposing the cup holders 120, 120 integrally mounted within the cupholder mounting bracket assembly 102. It is lastly noted that the pivotal connection 172, disposed within the ovoid slot 173, will move upwardly and downwardly therewithin, as the aforenoted pivotal and translational movements are occurring, so as to facilitate the smooth pivotal and translational movements of the linkage members 158, 160, 164, 168 as the fourth linkage member 168 undergoes it pivotal or rotational movement around the lower pivotal connection 180, and as the third linkage member 164 pivots or rotates in the clockwise direction during which the pivotal connection 166 will effectively bypass or move across the location of the pivotal connection 172, that is, as viewed in FIG. 4a, moves from a first position, which is to the left of the pivotal connection 172, to a second position which is to the right of pivotal connection 172.

Obviously, many variations and modifications of the present invention are possible in light of the above teachings. It is therefore to be understood that within the scope of the appended claims, the present invention may be practiced otherwise than as specifically described herein.

What is claimed is:

1. A concealable storage compartment assembly for use within a furniture piece, comprising:
    a storage compartment assembly fixedly mounted within a furniture piece and having a storage compartment mounted within said storage compartment assembly;
    a cover mounted upon said storage compartment assembly so as to be movable between a closed position, at which said cover covers and conceals said storage compartment mounted within said storage compartment assembly, and an open position at which said cover uncovers and exposes said storage compartment;
    a panel assembly movably mounted within said furniture piece so as to be movable between closed and open positions; and
    a linkage assembly operatively connecting said panel assembly to said cover such that when said panel assembly is moved from said closed position to said open position, said cover will be moved from said closed position to said open position so as to uncover and expose said storage compartment mounted within said storage compartment assembly, and when said panel assembly is moved from said open position to said closed position, said cover will be moved from said open position to said closed position so as to cover and conceal said storage compartment mounted within said storage compartment assembly.

2. The concealable storage compartment assembly as set forth in claim 1, further comprising:
    a pair of oppositely disposed mounting brackets adapted to be mounted upon interior portions of said furniture piece;
    said panel assembly comprises a pair of oppositely disposed side panel members and a front panel member; and
    said linkage assembly comprises a pair of oppositely disposed linkage member pivotally connected to said pair of oppositely disposed mounting brackets and fixedly connected to said pair of oppositely disposed side panel members,
    whereby when a user grasps said front panel member of said panel assembly, said panel assembly can be moved between said open and closed positions so as to, in turn, move said cover between said open and closed positions so as uncover and expose said storage compartment, and to cover and conceal said storage compartment.

3. The concealable storage compartment assembly as set forth in claim 1, wherein:
    said storage compartment assembly comprises a pair of oppositely disposed track members; and
    said cover comprises a plurality of projections which are disposed upon opposite sides of said cover and which are adapted to be disposed within said pair of oppositely disposed track members of said storage compartment assembly such that movement of said cover, between said open and closed positions, and relative to said storage compartment assembly, is guided as a result of said projections of said cover moving along said tracks of said storage compartment assembly.

4. The concealable storage compartment assembly as set forth in claim 3, wherein:
a pair of detents are movably mounted within said track members of said storage compartment assembly such that said projections of said cover can pass by said detents as said cover is being mounted upon said storage compartment assembly, however, said detents prevent retrograde movement of said projections beyond said detents such that said detents effectively serve as limit stops to prevent said cover from inadvertently being removed from said storage compartment assembly.

5. The concealable storage compartment assembly as set forth in claim 1, wherein:
said furniture piece comprises a console.

6. The concealable storage compartment assembly as set forth in claim 1, wherein:
said furniture piece comprises a lounger chair.

7. The concealable storage compartment assembly as set forth in claim 1, wherein:
said storage compartment and said panel assembly of said furniture component are mounted within an arm of said furniture component.

8. The concealable storage compartment assembly as set forth in claim 1, wherein:
said storage compartment assembly comprises a cup holder assembly having at least one cup holder mounted therein; and
said cover comprises a wireless charging station integrally incorporated within said cover.

9. A chair having a concealable storage compartment assembly mounted therein, comprising:
a storage compartment assembly fixedly mounted within a component of a chair and having storage compartment mounted within said storage compartment assembly;
a cover mounted upon said storage compartment assembly so as to be movable between a closed position, at which said cover covers and conceals said storage compartment mounted within said storage compartment assembly, and an open position at which said cover uncovers and exposes said storage compartment;
a panel assembly movably mounted within said component of said chair so as to be movable between closed and open positions; and
a linkage assembly operatively connecting said panel assembly to said cover such that when said panel assembly is moved from said closed position to said open position, said cover will be moved from said closed position to said open position so as to uncover and expose said at storage compartment mounted within said storage compartment assembly, and when said panel assembly is moved from said open position to said closed position, said cover will be moved from said open position to said closed position so as to cover and conceal said storage compartment mounted within said storage compartment assembly.

10. The chair set forth in claim 9, further comprising:
a pair of oppositely disposed mounting brackets adapted to be mounted upon interior portions of said component of said chair;
said panel assembly comprises a pair of oppositely disposed side panel members and a front panel member; and
said linkage assembly comprises a pair of oppositely disposed linkage member pivotally connected to said pair of oppositely disposed mounting brackets and fixedly connected to said pair of oppositely disposed side panel members,
whereby when a user grasps said front panel member of said panel assembly, said panel assembly can be moved between said open and closed positions so as to, in turn, move said cover between said open and closed positions so as uncover and expose said storage compartment, and to cover and conceal said storage compartment.

11. The chair as set forth in claim 9, wherein:
said storage compartment assembly comprises a pair of oppositely disposed track members; and
said cover comprises a plurality of projections which are disposed upon opposite sides of said cover and which are adapted to be disposed within said pair of oppositely disposed track members of said storage compartment such that movement of said cover, between said open and closed positions, and relative to said storage compartment assembly, is guided as a result of said projections of said cover moving along said tracks of said storage compartment assembly.

12. The chair as set forth in claim 11, wherein:
a pair of detents are movably mounted within said track members of said storage compartment assembly such that said projections of said cover can pass by said detents as said cover is being mounted upon said storage compartment assembly, however, said detents prevent retrograde movement of said projections beyond said detents such that said detents effectively serve as limit stops to prevent said cover from inadvertently being removed from said storage compartment assembly.

13. The chair as set forth in claim 9, wherein:
said chair comprises a lounger chair.

14. The chair as set forth in claim 9, wherein:
said component of said chair comprises an arm of said chair.

15. The chair as set forth in claim 9, wherein:
said storage compartment assembly comprises a cup holder assembly having at least one cup holder mounted therein; and
said cover comprises a wireless charging station integrally incorporated within said cover.

16. A furniture console having a concealable storage compartment assembly mounted therein, comprising:
a storage compartment assembly fixedly mounted within a furniture console and having a storage compartment mounted within said storage compartment assembly;
a cover mounted upon said storage compartment assembly so as to be movable between a closed position, at which said cover covers and conceals said storage compartment mounted within said storage compartment assembly, and an open position at which said cover uncovers and exposes said storage compartment;
a panel assembly movably mounted within said console so as to be movable between closed and open positions; and
a linkage assembly operatively connecting said panel assembly to said cover such that when said panel assembly is moved from said closed position to said open position, said cover will be moved from said closed position to said open position so as to uncover and expose said storage compartment mounted within said storage compartment assembly, and when said panel assembly is moved from said open position to said closed position, said cover will be moved from said open position to said closed position so as to cover and conceal said storage compartment mounted within said storage compartment assembly.

17. The console as set forth in claim 16, further comprising:
a pair of oppositely disposed mounting brackets adapted to be mounted upon interior portions of said compartment of said console;
said panel assembly comprises a pair of oppositely disposed side panel members and a front panel member; and
said linkage assembly comprises a pair of oppositely disposed linkage member pivotally connected to said pair of oppositely disposed mounting brackets and fixedly connected to said pair of oppositely disposed side panel members,
whereby when a user grasps said front panel member of said panel assembly, said panel assembly can be moved between said open and closed positions so as to, in turn, move said cover between said open and closed positions so as uncover and expose said storage compartment, and to cover and conceal said storage compartment.

18. The console as set forth in claim 16, wherein:
said storage compartment assembly comprises a pair of oppositely disposed track members; and
said cover comprises a plurality of projections which are disposed upon opposite sides of said cover and which are adapted to be disposed within said pair of oppositely disposed track members of said storage compartment such that movement of said cover, between said open and closed positions, and relative to said storage compartment assembly, is guided as a result of said projections of said cover moving along said tracks of said storage compartment assembly.

19. The console as set forth in claim 18, wherein:
a pair of detents are movably mounted within said track members of said storage compartment assembly such that said projections of said cover can pass by said detents as said cover is being mounted upon said storage compartment assembly, however, said detents prevent retrograde movement of said projections beyond said detents such that said detents effectively serve as limit stops to prevent said cover from inadvertently being removed from said storage compartment assembly.

20. The console as set forth in claim 16, wherein:
said storage compartment assembly comprises a cup holder assembly having at least one cup holder mounted therein; and
said cover comprises a wireless charging station integrally incorporated within said cover.

* * * * *